(12) United States Patent
Shin et al.

(10) Patent No.: US 11,084,395 B2
(45) Date of Patent: Aug. 10, 2021

(54) BATTERY MANAGEMENT SYSTEM FOR VEHICLE, BATTERY MANAGEMENT METHOD THEREOF AND VEHICLE INCLUDING THE SAME

(71) Applicants: HYUNDAI MOTOR COMPANY, Seoul (KR); KIA MOTORS CORPORATION, Seoul (KR)

(72) Inventors: Jin Cheol Shin, Hwaseong-si (KR); Kyu Beom Ko, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 145 days.

(21) Appl. No.: 16/684,164

(22) Filed: Nov. 14, 2019

(65) Prior Publication Data

US 2021/0001746 A1 Jan. 7, 2021

(30) Foreign Application Priority Data

Jul. 1, 2019 (KR) .......................... 10-2019-0078757

(51) Int. Cl.
*B60L 58/12* (2019.01)
*B60L 53/66* (2019.01)
(Continued)

(52) U.S. Cl.
CPC ................. *B60L 58/12* (2019.02); *B60L 7/10* (2013.01); *B60L 50/66* (2019.02); *B60L 53/31* (2019.02); *B60L 53/62* (2019.02); *B60L 53/66* (2019.02); *B60L 2240/62* (2013.01); *B60L 2240/642* (2013.01); *B60L 2240/645* (2013.01)

(58) Field of Classification Search
CPC .......... B60L 58/12; B60L 53/66; B60L 53/62; B60L 7/10; B60L 50/66; B60L 53/31; B60L 2240/645; B60L 2240/62; B60L 2240/642; B60L 53/60; Y02T 90/16; Y02T 90/12; Y02T 10/7072; Y02T 10/72; Y02T 10/70

See application file for complete search history.

(56) References Cited

U.S. PATENT DOCUMENTS

9,039,568 B2 * 5/2015 Banker ................. B60W 20/20 477/4
10,137,880 B2 * 11/2018 Ogawa .................. B60W 10/06
(Continued)

*Primary Examiner* — Nha T Nguyen
(74) *Attorney, Agent, or Firm* — Brinks Gilson & Lione (57) ABSTRACT

A battery management system for a vehicle, a battery management method thereof and a vehicle including the same, which can vary a state of charge (SOC) of a battery in accordance with a location of a recharging station are disclosed. The battery management system includes: a position information acquisition unit for acquiring position information of a recharging station and the vehicle; a storage for storing a hilly area recharging station list comprising position information of hilly area recharging stations and learned full SOC values; and a controller for controlling the position information acquisition unit and the storage. The controller checks whether a recharging station where recharging of the vehicle is executed is a hilly area recharging station, and restricts a full SOC in order to avoid restriction of regenerative braking according to downhill road travel, thereby enhancing fuel economy and safety.

20 Claims, 4 Drawing Sheets

(51) Int. Cl.
  *B60L 53/62* (2019.01)
  *B60L 7/10* (2006.01)
  *B60L 50/60* (2019.01)
  *B60L 53/31* (2019.01)

(56) References Cited

U.S. PATENT DOCUMENTS

| | | | |
|---|---|---|---|
| 10,246,076 B2* | 4/2019 | Ogawa | B60W 10/26 |
| 10,392,003 B2* | 8/2019 | Hawley | B60W 20/15 |
| 10,618,512 B2* | 4/2020 | Hawley | B60K 6/387 |
| 10,843,680 B2* | 11/2020 | Peterson | B60W 10/08 |
| 2015/0073637 A1* | 3/2015 | Lennevi | B60W 10/08 701/22 |
| 2015/0097512 A1* | 4/2015 | Li | B60L 58/13 320/101 |
| 2016/0137185 A1* | 5/2016 | Morisaki | B60K 6/445 701/22 |
| 2016/0167641 A1* | 6/2016 | Yoon | G08G 1/09626 701/22 |
| 2017/0028981 A1* | 2/2017 | Ogawa | B60W 20/12 |
| 2017/0305290 A1* | 10/2017 | Huff | B60K 25/10 |
| 2017/0355358 A1* | 12/2017 | Ogawa | B60W 10/08 |
| 2019/0366873 A1* | 12/2019 | Fujitake | B60L 58/15 |
| 2020/0161874 A1* | 5/2020 | Ito | B60L 7/16 |
| 2020/0171970 A1* | 6/2020 | Lee | B60L 58/12 |

* cited by examiner

BATTERY MANAGEMENT SYSTEM FOR VEHICLE, BATTERY MANAGEMENT METHOD THEREOF AND VEHICLE INCLUDING THE SAME

CROSS-REFERENCE TO RELATED APPLICATION

This application claims priority to and the benefit of Korean Patent Application No. 10-2019-0078757, filed on Jul. 1, 2019, the entire contents of which are incorporated by reference.

FIELD

The present disclosure relates to a battery management system for a vehicle, and a battery management method thereof.

BACKGROUND

The statements in this section merely provide background information related to the present disclosure and may not constitute prior art.

A hybrid electric vehicle (HEV), an electric vehicle (EV), a fuel cell vehicle (FCV), etc. have recently been developed as a scheme for improving the global environment, and are commercially available. In particular, it is expected that development of electric vehicles will be highlighted in future.

In such an electric vehicle, regenerative braking may be utilized in order to achieve an enhancement in fuel economy.

In accordance with a regenerative braking technology, a portion of braking force generated during braking of an electric vehicle is used for generation of electricity and, as such, electrical energy attained through electricity generation recharges a battery. In addition, kinetic energy generated during travel of the electric vehicle may be used as energy needed for driving of an electric generator.

However, when the state of charge (SOC) of the battery in the electric vehicle is full, recharging of the battery may be restricted due to regenerative braking.

To this end, when regenerative braking of the electric vehicle is restricted, braking is performed only through a hydraulic brake in order to prevent restriction of battery recharging. However, we have discovered that when the electric vehicle travels on a downhill road in a hilly area under the above-mentioned condition, there may be problems of overheating of a brake pad, sense of difference in vehicle braking, or the like.

Furthermore, during travel of the electric vehicle on a downhill road, it is difficult to perform recharging according to regenerative braking and, as such, degradation in fuel economy, an increase in recharging costs, etc. may occur.

In future, therefore, it will be desired to develop a battery management system for a vehicle.

SUMMARY

The present disclosure provides a battery management system for a vehicle, a battery management method thereof and a vehicle including the same to enhance fuel efficiency and safety by restricting a full state of charge (SOC) of a battery in downhill road travel environment while limiting regenerative braking restriction.

In one form of the present disclosure, the battery management system for a vehicle, the battery management method thereof and a vehicle including the same, are capable of checking for downhill road travel environment, and restricting a full state of charge (SOC) in order to avoid regenerative braking restriction during downhill road travel, thereby enhancing fuel efficiency and safety.

Additional advantages, objects, and features of the forms will be set forth in part in the description which follows and in part will become apparent to those having ordinary skill in the art upon examination of the following or may be learned from practice of the forms. The objectives and other advantages of the forms may be realized and attained by the structure particularly pointed out in the written description and claims hereof as well as the appended drawings.

In one form of the present disclosure, a battery management system for a vehicle includes: a position information acquisition unit for acquiring position information of a recharging station and the vehicle, a storage unit for storing a hilly area recharging station list including position information of hilly area recharging stations and learned full state of charge (SOC) values, and a controller for controlling the position information acquisition unit and the storage unit. In particular, the controller controls the position information acquisition unit upon receiving a battery recharging request in order to acquire position information of a current recharging station, checks whether or not the current recharging station is on the hilly area recharging station list, based on the acquired current recharging station position information, checks whether or not there is a learned full SOC value corresponding to the current recharging station when the current recharging station is on the hilly area recharging station list, executes battery recharging in the current recharging station based on a learned full SOC value corresponding to the current recharging station when there is the learned full SOC value, and adjusts the learned full SOC value in accordance with an SOC value corresponding to an end time of downhill road travel of the vehicle when the vehicle travels on a downhill road or whether or not there is restriction of regenerative braking at the end time of the downhill road travel, thereby executing re-learning of the learned full SOC value.

In another aspect of the present disclosure, a battery management method of a battery management system for a vehicle including a controller for controlling a position information acquisition unit to acquire position information of a recharging station and the vehicle and a storage unit to store a hilly area recharging station list includes checking, by the controller, whether or not there is a battery recharging request, acquiring, by the controller, position information of a current recharging station through the recharging station position information acquisition unit when there is a battery recharging request, checking, by the controller, whether or not the current recharging station is on a hilly area recharging station list, based on the acquired position information of the current recharging station, checking, by the controller, whether or not there is a learned full state of charge (SOC) value corresponding to the current recharging station when the current recharging station is on the hilly area recharging station list, executing, by the controller, battery recharging in the current recharging station based on a learned full SOC value corresponding to the current recharging station when there is the learned full SOC value, checking, by the controller, whether or not the vehicle travels on a downhill road, and executing, by the controller, re-learning of the learned full SOC value when the vehicle travels on a downhill road by adjusting the learned full SOC value in accordance with an SOC value corresponding to an end time of the downhill road travel or whether or not there is a restriction of regenerative braking at the end time of the downhill road travel.

In another aspect of the present disclosure, a computer-readable recording medium on which a program for executing the battery management method of the battery management system according to the above aspect of the present disclosure is written executes procedures provided in the battery management method.

In another aspect of the present disclosure, a vehicle includes a battery for recharging electrical energy, and a battery management system for managing recharging of the battery, wherein the battery management system acquires position information of a current recharging station upon receiving a battery recharging request, checks whether or not the current recharging station is on the hilly area recharging station list, based on the acquired current recharging station position information, checks whether or not there is a learned full state of charge (SOC) value corresponding to the current recharging station when the current recharging station is on the hilly area recharging station list, executes battery recharging in the current recharging station based on a learned full SOC value corresponding to the current recharging station when there is the learned full SOC value, and adjusts the learned full SOC value in accordance with an SOC value corresponding to an end time of downhill road travel of the vehicle when the vehicle travels on a downhill road or whether or not there is a restriction of regenerative braking at the end time of the downhill road travel, thereby executing re-learning of the learned full SOC value.

The battery management system for vehicles, the battery management method thereof and a vehicle including the same, which have the above-described configurations according to at least one aspect of the present disclosure, may have effects of enhancing fuel economy and safety by recognizing downhill road travel environment through checking of whether or not the current recharging station is a hilly area recharging station, and limiting an SOC in order to prevent restriction of regenerative braking according to downhill road travel.

That is, in accordance with the present disclosure, it may be possible to inhibit or prevent danger of accidents and sense of difference in vehicle braking caused by regenerative braking restriction occurring during downhill road travel. An enhancement in fuel economy may also be achieved in accordance with maximum recovery of regenerative braking energy.

In accordance with the present disclosure, it may also be possible to execute control to prevent occurrence of restriction of regenerative braking during downhill road travel after recharging by receiving a recharging position through a GPS, and limiting a full SOC upon recharging in a hilly area, taking into consideration a vehicle state (battery temperature, motor temperature, inverter temperature, etc.).

In addition, in accordance with the present disclosure, it may be possible to execute control to prevent occurrence of restriction of regenerative braking during downhill road travel after recharging by learning positions of hilly area recharging stations and, as such, limiting a full SOC upon recharging in a hilly area, It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings and, as such, may be easily implemented by one of ordinary skill in the art to which the present disclosure pertains. The present disclosure may be embodied in many different forms and should not be construed as limited to the forms set forth herein. Matters having no relation with the present disclosure will be omitted, for clarity of explanation.

In addition, terms such as " . . . section", " . . . unit", " . . . module", and the like used herein indicate a unit for performing at least one function or operation and may be implemented by hardware or software or a combination thereof.

The terms "including", "comprising", "having" and variations thereof disclosed herein mean "including but not limited to" unless expressly specified otherwise, and, as such, should not be construed to exclude elements other than the elements disclosed herein and should be construed to further include additional elements. Elements designated by the same reference numerals throughout the specification mean the same constituent elements.

Hereinafter, a battery management system for a vehicle, a battery management method thereof and a vehicle including the same, which may be applied to forms of the present disclosure, will be described in detail with reference to FIGS. 1 to 5.

Figure 1:
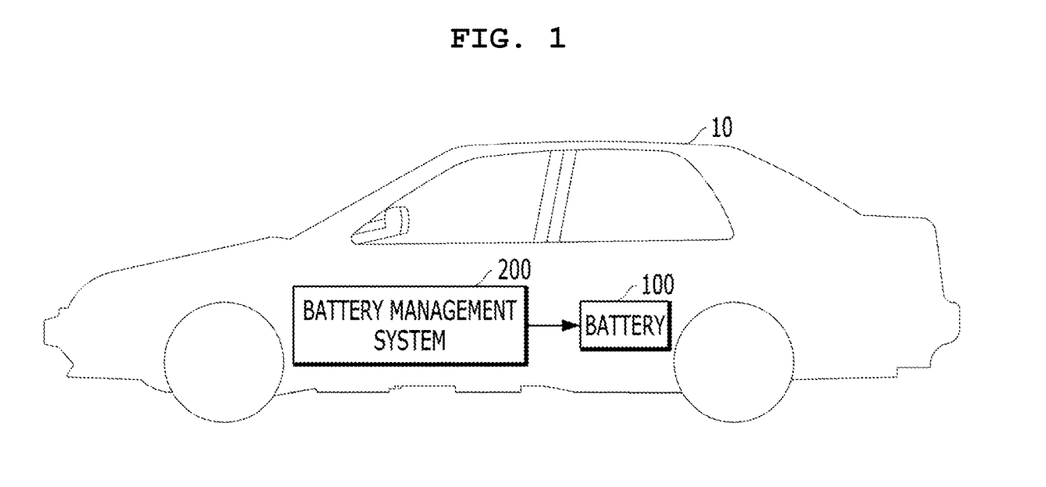
FIG. 1 is a view illustrating a vehicle including a battery management system for a vehicle.

FIG. 1 is a view illustrating a vehicle including a battery management system for vehicles according to one form of the present disclosure.

As illustrated in FIG. 1, the vehicle including the battery management system, that is, a vehicle 10, may include a battery 100, and a battery management system 200 for managing recharging of the battery 100.

In this case, the battery management system 200 may acquire information as to a position of the current recharging station when recharging of the battery 100 is requested.

For example, the battery management system 200 may acquire information as to positions of the recharging station and the vehicle through a global positioning system (GPS).

In addition, the battery management system 200 may check whether or not the current recharging station is on a previously-stored hilly area recharging station list, based on the acquired current recharging station position.

Here, the previously-stored hilly area recharging station list may include position information as to recharging stations located in hilly areas. The position information as to recharging stations located in hilly areas may be repetitively updated through learning.

In this case, the reason why the battery management system 200 checks whether the current recharging station is on the hilly area recharging station list is that, when the current recharging station is on the hilly area recharging station list, the current recharging station may be recognized as being positioned in a hilly area and, as such, downhill road travel of the vehicle is predicted.

When the current recharging station is on the hilly area recharging station list, the battery management system 200 may then check whether or not there is a learned full SOC value corresponding to the current recharging station.

For example, the hilly area recharging station list may include learned full SOC values corresponding to position information as to hilly area recharging stations. There may be learned full SOC values corresponding to position information as to all hilly area recharging stations or only a part of the hilly area recharging stations.

Here, the learned full SOC values may be repetitively updated through learning.

When there is a learned full SOC value, the battery management system 200 may then execute battery recharging in the current recharging station, based on the learned full SOC value.

On the other hand, when there is no learned full SOC value, the battery management system 200 may execute battery recharging in the current recharging station, based on a lower SOC value than a full SOC value.

Here, the SOC value lower than the full SOC value may be varied in accordance with the kind of the vehicle. This SOC value may be predetermined or may be set to an appropriate value through learning.

The reason why the battery management system 200 executes battery recharging in the current recharging station, based on a learned full SOC value or a lower SOC value than a full SOC value is to predict restriction of regenerative braking caused by downhill road travel of the vehicle 10 in order to control regenerative braking such that no restriction of regenerative braking occurs, thereby preventing problems such as damage to a brake and sense of difference in vehicle braking while preventing degradation in fuel economy and an increase in recharging costs in accordance with recharging through regenerative braking during downhill road travel.

When the vehicle 10 travels on a downhill road, the battery management system 200 may execute re-learning of the learned full SOC value based on an SOC value corresponding to a time when the downhill road travel ends or whether or not there is restriction of regenerative braking at the end time of the downhill road travel.

In this case, the battery management system 200 may enhance reliability of the learned full SOC value by calculating an SOC value corresponding to the end time of the downhill road travel or checking whether or not there is restriction of regenerative braking at the end time of the downhill road travel, and then executing re-learning of the learned full SOC value based on the calculated SOC value or checked results.

That is, re-learning of the learned full SOC value through adjustment of the learned full SOC value in the battery management system 200 may be achieved by checking whether or not the vehicle 10 travels on a downhill road after battery recharging, calculating an SOC value corresponding to an end time of downhill road travel of the vehicle 10 when the vehicle 10 travels on a downhill road after battery recharging, and adjusting the learned full SOC value based on the calculated SOC value.

On the other hand, re-learning of the learned full SOC value through adjustment of the learned full SOC value in the battery management system 200 may be achieved by checking whether or not the vehicle 10 travels on a downhill road after battery recharging, checking whether or not there is restriction of regenerative braking at a time when downhill road travel ends when the vehicle 10 travels on a downhill road after battery recharging, and adjusting the learned full SOC value in accordance with checked results as to restriction of regenerative braking.

If desired, upon checking whether or not the current recharging station is on the hilly area recharging station list, the battery management system 200 may execute battery recharging to a full SOC value when the current recharging station is not on the hilly area recharging station list. In addition, when the vehicle travels on a downhill road, the battery management system 200 may check whether or not restriction of regenerative braking of the vehicle occurs, and adding information as to the current recharging station to the hilly area recharging station list, thereby updating the hilly area recharging station list.

In this case, when it is checked that no restriction of regenerative braking of the vehicle occurs, the battery management system 200 may maintain the hilly area recharging station list.

As described above, in accordance with the present disclosure, it may be possible to execute control to prevent occurrence of restriction of regenerative braking during downhill road travel after recharging by receiving a recharging position through a GPS, and limiting a full SOC upon recharging in a hilly area, taking into consideration a vehicle state (battery temperature, motor temperature, inverter temperature, etc.).

Figure 2:
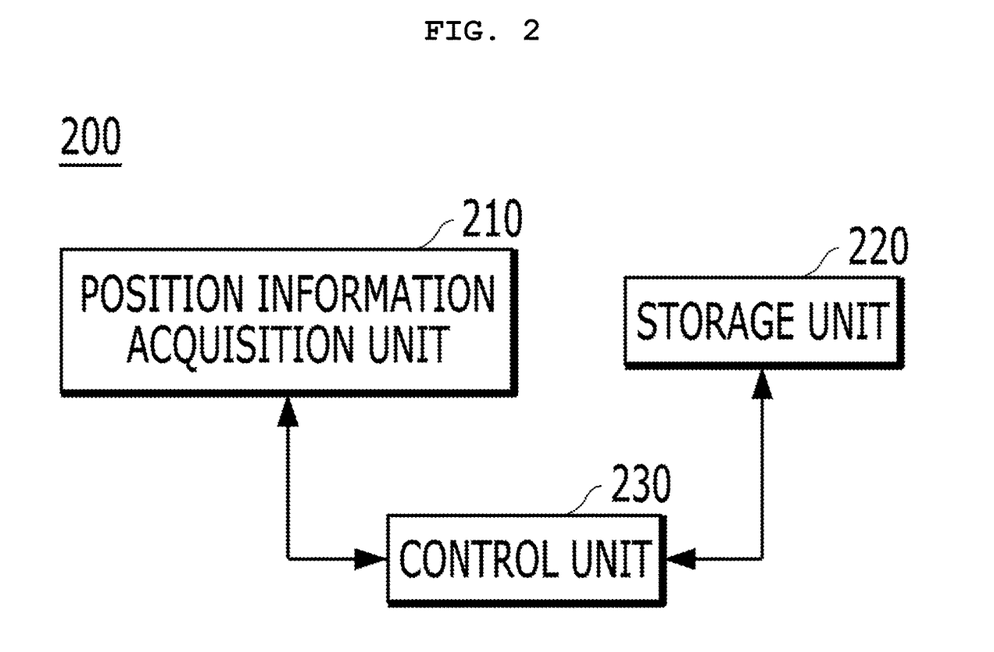
FIG. 2 is a block diagram explaining a configuration of the battery management system.

In addition, in accordance with the present disclosure, it may be possible to execute control to prevent occurrence of restriction of regenerative braking during downhill road travel after recharging by learning positions of hilly area recharging stations and, as such, limiting a full SOC upon recharging in a hilly area, FIG. 2 is a block diagram explaining a configuration of the battery management system according to one form of the present disclosure.

As illustrated in FIG. 2, the battery management system 200 may include a position information acquisition unit 210 for acquiring position information of a recharging station and the vehicle, a storage unit 220 for storing a hilly area recharging station list including position information of hilly area recharging stations and learned full SOC values, and a control unit (i.e., a controller) 230 for controlling the recharging station position information acquisition unit 210 and the storage unit 220.

In this case, the position information acquisition unit 20 may acquire position information of a recharging station and the vehicle based on a global positioning system (GPS).

Upon receiving a battery recharging request, the control unit 230 may control the position information acquisition unit 210 in order to acquire position information of the current recharging station, may check whether or not the current recharging station is on a hilly area recharging station list, based on the acquired current recharging station position information, may check whether or not there is a learned full SOC value corresponding to the current recharging station when the current recharging station is on the hilly area recharging station list, may execute battery recharging in the current recharging station based on a learned full SOC value corresponding to the current recharging station when there is the learned full SOC value, and may adjust the learned full SOC value in accordance with an SOC value corresponding to an end time of downhill road travel of the vehicle when the vehicle travels on a downhill road or whether or not there is restriction of regenerative braking at the end time of the downhill road travel, thereby executing re-learning of the learned full SOC value.

Upon checking whether or not the current recharging station is on the hilly area recharging station list, the control unit 230 may recognize the current recharging station as being located in a hilly area when the current recharging station is on the hilly area recharging station list, and may then predict downhill road travel of the vehicle.

Upon checking whether or not the current recharging station is on the hilly area recharging station list, the control unit 230 executes battery recharging to a full SOC value when the current recharging station is not on the hilly area recharging station list. When the vehicle travels on a downhill road, the control unit 230 checks whether or not restriction of regenerative braking of the vehicle occurs. When restriction of regenerative braking of the vehicle occurs, the control unit 230 may add information of the current recharging station to the hilly area recharging station list.

Upon checking whether or not restriction of regenerative braking of the vehicle occurs, the control unit 230 may maintain the hilly area recharging station list when no restriction of regenerative braking of the vehicle occurs.

That is, upon checking whether or not restriction of regenerative braking of the vehicle occurs, the control unit 230 may recognize the current recharging station not as being positioned in a hilly area.

In addition, upon adding information of the current station to the hilly area recharging station list, the control unit 230 may add a full SOC value to the hilly area recharging station list as a learned full SOC value of the current recharging station.

Upon checking whether or not there is a learned full SOC value corresponding to the current recharging station, the control unit 230 may execute battery recharging to a lower SOC value than the full SOC value in the current recharging station when there is no learned full SOC value corresponding to the current recharging station.

For example, in the case in which battery recharging is executed to a lower SOC value than the full SOC value, the control unit 230 may execute battery recharging to an SOC value lower than the full SOC value by about 1 to 10%. In one form, battery recharging may be executed to an SOC value lower than the full SOC value by about 1 to 3% in the current recharging station.

In addition, the control unit 230 may execute battery recharging to an SOC value lower than the full SOC value in the current recharging station, and may then add the SOC value lower than the full SOC value to the hilly area recharging station list as a learned full SOC value.

For example, the SOC value lower than the full SOC value may be equal to a full SOC value calculated at an end time of battery recharging.

Upon re-learning the learned full SOC value through adjustment of the learned full SOC value, the control unit 230 may execute re-learning of the learned full SOC value by calculating an SOC value corresponding to an end time of downhill road travel when the vehicle travels on a downhill road after battery recharging, and adjusting the learned full SOC value based on the calculated SOC value.

Upon calculating an SOC value corresponding to an end time of downhill road travel, the control unit 230 may control the recharging station position information acquisition unit 210 to acquire position information of the vehicle when the vehicle travels on a downhill road after battery recharge, and may identify an end time of the downhill road travel based on the position information of the vehicle. Under the condition that the end time of the downhill road travel is identified, the control unit 230 may calculate an SOC value corresponding to the end time of the downhill road travel.

In addition, upon re-learning the learned full SOC value through adjustment of the learned full SOC value based on the calculated SOC value, the control unit 230 may compare the calculated SOC value with a full SOC value calculated at an end time of battery recharging, and may adjust the learned full SOC value based on compared results, thereby re-learning the learned full SOC value.

For example, upon re-learning the learned full SOC value through adjustment of the learned full SOC value, the control unit 230 may adjust the learned full SOC value such that the full SOC value calculated at the end time of battery recharging increases when the calculated SOC value is determined to be equal to or lower than the full SOC value calculated at the end time of battery recharging in accordance with results of the comparison between the calculated SOC value and the calculated full SOC value, and, as such, re-learning of the learned full SOC value may be achieved.

When the calculated SOC value is higher than the full SOC value calculated at the end time of battery recharging, the control unit 230 may maintain the learned full SOC value without adjustment.

In addition, upon re-learning the learned full SOC value through adjustment of the learned full SOC value, the control unit 230 may check whether or not there is restriction of regenerative braking at an end time of downhill road travel when the vehicle travels on a downhill road after battery recharging, and may adjust the learned full SOC value in accordance with whether or not there is the restriction of regenerative braking, and, as such, may achieve re-learning of the learned full SOC value.

In this case, upon checking whether or not there is restriction of regenerative braking at an end time of downhill road travel, the control unit 230 may control the recharging station position information acquisition unit 210 to acquire position information of the vehicle when the vehicle travels on a downhill road after battery recharging, and may then identify an end time of the downhill road travel based on the position information of the vehicle, and, as such, may check whether or not there is restriction of regenerative braking at the end time of the downhill road travel identified as described above.

For example, upon re-learning the learned full SOC value through adjustment of the learned full SOC value in accordance with whether or not there is restriction of regenerative braking, the control unit 230 may adjust the learned full SOC value such that the full SOC value calculated at the end time of battery recharging decreases when there is restriction of regenerative braking at the end time of the downhill road travel and, as such, may achieve re-learning of the learned full SOC value.

In this case, when there is no restriction of regenerative braking at the end time of the downhill road travel, the control unit 230 may maintain the learned full SOC value without adjustment.

Figure 3:
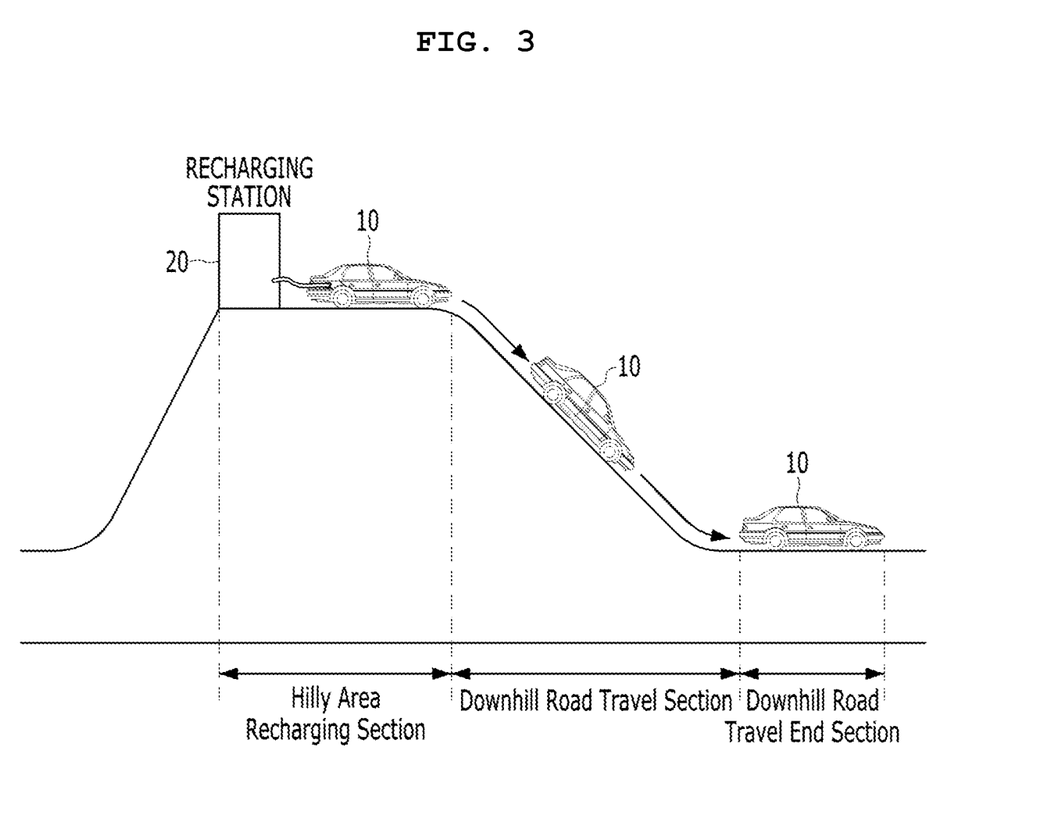
FIG. 3 is a diagram explaining a procedure of learning state of charge (SOC) variation according to downhill road travel of the vehicle.
Figure 4:
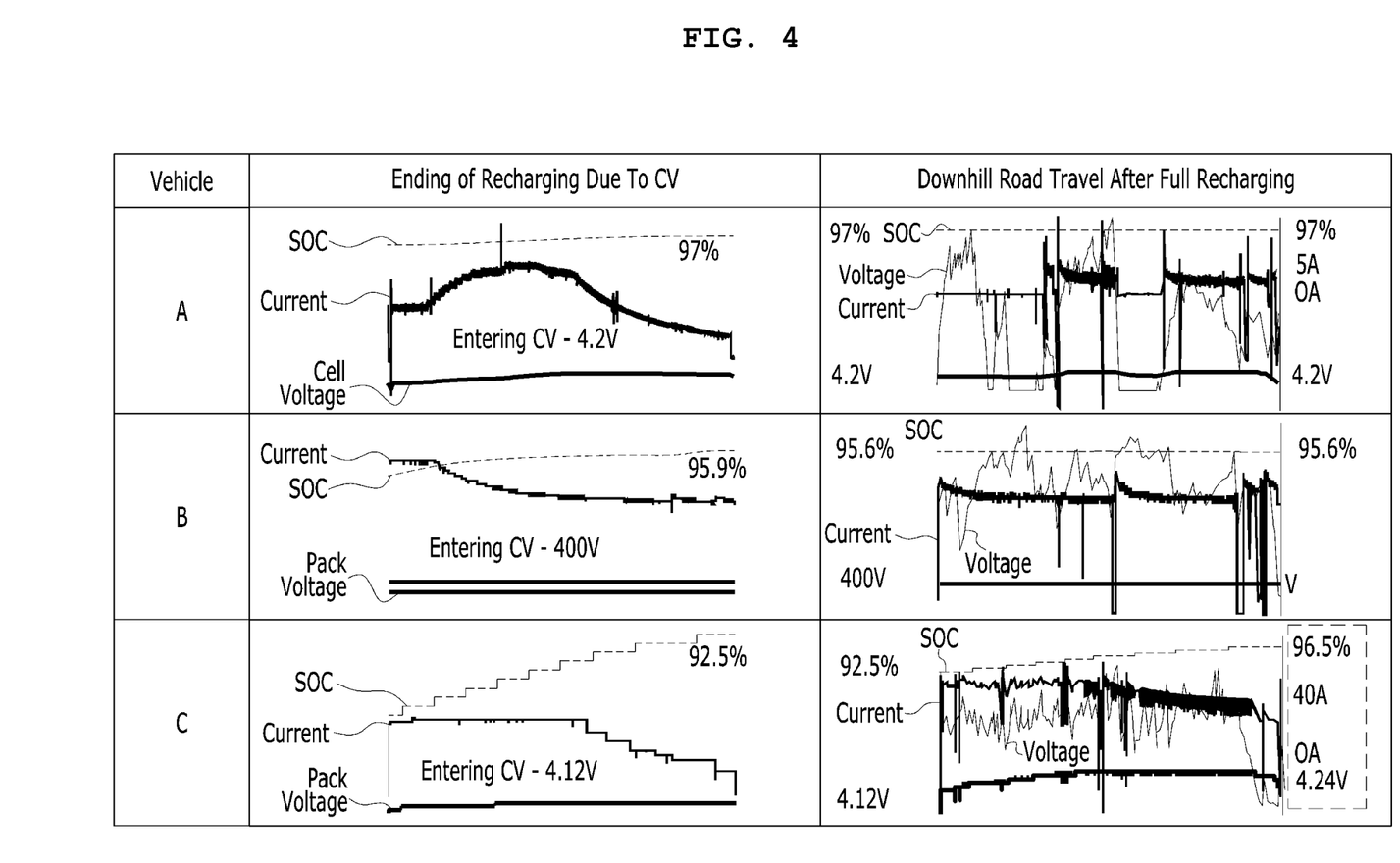
FIG. 4 is a graph depicting an SOC variation according to downhill road travel of the vehicle after recharging.

FIG. 3 is a diagram explaining a procedure of learning an SOC variation according to downhill road travel of the vehicle. FIG. 4 is a graph depicting SOC variation according to downhill road travel of the vehicle after recharging.

As illustrated in FIGS. 3 and 4, upon performing recharging in a recharging station 20 located in a hilly area, the vehicle 10 including the battery management system of the present disclosure may acquire position information of the current recharging station 20, and may check whether or not the current recharging station 20 is on the previously stored hilly area recharging station list.

When the current recharging station 20 is on the hilly area recharging station list, the battery management system may recognize the current recharging station 20 as being located in a hilly area, and may predict downhill road travel of the vehicle 10.

When the battery management system subsequently recognizes the vehicle 10 as being positioned in a hilly area recharging section, the battery management system may execute battery recharging to a lower SOC value than a predetermined learned full SOC value or a predetermined full SOC value.

The reason why battery recharging is executed to a lower SOC value than the predetermined learned full SOC value or the predetermined full SOC value is to predict restriction of regenerative braking caused by downhill road travel of the vehicle 10 in order to execute control to prevent restriction of regenerative braking, thereby not only preventing occurrence of problems such as damage to a brake and sense of difference in vehicle braking, but also preventing degradation in fuel economy and an increase in recharging costs in accordance with recharging through regenerative braking during downhill road travel.

The vehicle 10 may subsequently travel on a downhill road in the downhill road travel section after completing recharging.

When the vehicle 10 enters downhill road travel end section, the battery management system may execute re-learning of the learned full SOC value by adjusting the learned full SOC value in accordance with an SOC value corresponding to an end time of the downhill road travel or whether or not there is restriction of regenerative braking at the end time of the downhill road travel.

In this case, the battery management system may calculate an SOC value at the end time of the downhill road travel while checking whether or not there is restriction of regenerative braking at the end time of the downhill road travel, and may re-learn the learned full SOC value based on the calculated SOC value or checked results, and, as such, may achieve an enhancement in the learned full SOC value.

For example, the battery management system may compare the calculated SOC value with a full SOC value calculated at an end time of battery recharging, and may achieve re-learning of the learned full SOC value by adjusting the learned full SOC value such that the full SOC value calculated at the end time of battery recharging increases, when the calculated SOC value is equal to or lower than the full SOC value calculated at the end time of battery recharging. On the other hand, when the calculated SOC value is higher than the full SOC value calculated at the end time of battery recharging, the battery management system may maintain the learned full SOC value without adjustment.

In addition, when there is restriction of regenerative braking at the end time of the downhill road travel, the battery management system may achieve re-learning of the learned full SOC value by adjusting the learned full SOC value such that the full SOC value calculated at the end time of battery recharging decreases. On the other hand, when there is no restriction of regenerative braking at the end time the downhill road travel, the battery management system may maintain the learned full SOC value without adjustment.

As illustrated in FIG. 4, vehicles A and B, which do not use a logic for varying a full SOC value in accordance with locations of recharging stations, may have problems such as damage to a brake and sense of difference in vehicle braking due to restriction of regenerative braking occurring during downhill road travel after full recharging. In the vehicles A and B, there is no recharging through regenerative braking and, as such, there may be degradation in fuel economy and an increase in recharging costs.

On the other hand, the vehicle C, which uses a logic for varying a full SOC value in accordance with locations of recharging stations, may execute control to prevent restriction of regenerative braking from occurring during downhill road travel after full recharging and, as such, may prevent problems such as damage to a brake and sense of difference in vehicle braking. It may also possible to prevent degradation in fuel economy and an increase in recharging costs in accordance with recharging through regenerative braking during downhill road travel.

Figure 5:
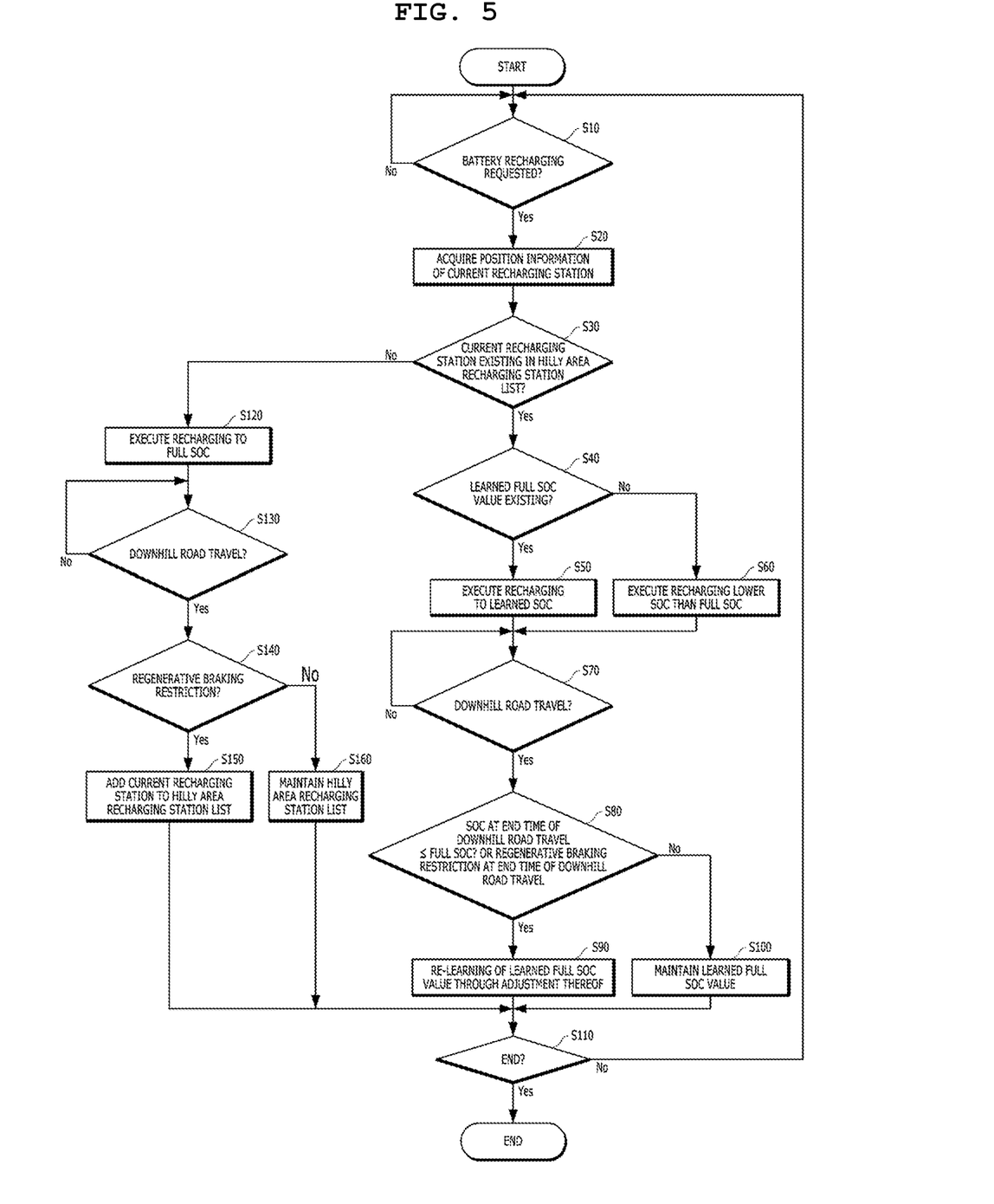
FIG. 5 is a flowchart explaining a battery management method of the battery management system.

FIG. 5 is a flowchart explaining a battery management method of the battery management system according to an form of the present disclosure.

As illustrated in FIG. 5, the battery management method according to the illustrated form of the present disclosure may first check whether or not there is a battery recharging request (S10).

When there is a battery recharging request, the battery management method may acquire position information of the current recharging station (S20).

Thereafter, the battery management method may check whether or not the current recharging station is on a hilly area recharging station list, based on the acquired position information of the current recharging station (S30).

When the current recharging station is on the hilly area recharging station list, the battery management method may then check whether or not there is a learned full SOC value corresponding to the current recharging station (S40).

When the current recharging station is on the hilly area recharging station list, as described above, the battery management method may recognize the current recharging station as being located in a hilly area and, as such, may predict downhill road travel of the vehicle.

When there is a learned full SOC value corresponding to the current recharging station, the battery management method may execute battery recharging in the current recharging station based on the learned full SOC value (S50).

On the other hand, when there is no learned full SOC value corresponding to the current recharging station, the battery management method may execute battery recharging to a lower SOC value than a full SOC value in the current recharging station (S60).

In this case, the battery management method may execute battery recharging to a lower SOC value than a full SOC value in the current recharging station, and may add the SOC value lower than the full SOC value to the hilly area recharging station list as a learned full SOC value of the current recharging station.

The battery management method may then check whether or not the vehicle travels on a downhill road (S70).

When the vehicle travels on a downhill road, the battery management method may execute re-learning of the learned full SOC value by adjusting the learned full SOC value in accordance with an SOC value corresponding to an end time of the downhill road travel or whether or not there is restriction of regenerative braking at the end time of the downhill road travel.

That is, when the vehicle travels on a downhill road, the battery management method may check whether or not an SOC value corresponding to an end time of the downhill road travel is equal to or lower than a full SOC value or whether or not there is restriction of regenerative braking (S80). When the SOC value corresponding to the end time of the downhill road travel is equal to or lower than the full SOC value or there is restriction of regenerative braking, the battery management method may execute re-learning of the learned full SOC value by adjusting the learned full SOC value (S90).

On the other hand, when the SOC value corresponding to the end time of the downhill road travel is higher than the full SOC value or there is no restriction of regenerative braking, the battery management method may maintain the learned full SOC value without adjustment (S100).

Thereafter, the battery management method may check whether or not there is a request to end execution of a logic for varying a full SOC value in accordance with locations of recharging stations (S110). When there is a logic execution end request, the battery management method may, end overall procedures.

Meanwhile, when it is checked, at step S30 of checking whether or not the current recharging station is on the hilly area recharging station list, that the current recharging station is not on the hilly area recharging station list, the battery management method may execute battery recharging to a full SOC value (S120).

The battery management method may then check whether the vehicle travels on a downhill road (S130).

When the vehicle travels on a downhill road, the battery management method may then check whether or not there is restriction of regenerative braking of the vehicle (S140).

When there is restriction of regenerative braking of the vehicle, the battery management method may add the current recharging station to the hilly area recharging station list, for re-learning of a learned full SOC value of the current recharging station (S150).

Alternatively, the battery management method may add a full SOC value to the hilly area recharging station list as a learned full SOC value of the current recharging station, for re-learning of the learned full SOC value of the current recharging station.

On the other hand, when there is no restriction of regenerative braking of the vehicle, the battery management method may maintain the hilly area recharging station list (S160).

In this case, when there is no restriction of regenerative braking of the vehicle, the battery management method may recognize the current station not as being located in a hilly area.

As apparent from the above description, in accordance with the present disclosure, it may be possible to enhance fuel economy and safety by recognizing downhill road travel environment through checking of whether or not the current recharging station is a hilly area recharging station, and limiting an SOC in order to prevent restriction of regenerative braking according to downhill road travel.

That is, in accordance with the present disclosure, it may be possible to prevent danger of accidents and sense of difference in vehicle braking caused by restriction of regenerative braking occurring during downhill road travel. An enhancement in fuel economy may also be achieved in accordance with maximum recovery of regenerative braking energy.

In accordance with the present disclosure, it may also be possible to execute control to prevent occurrence of restriction of regenerative braking during downhill road travel after recharging by receiving a recharging position through a GPS, and limiting a full SOC upon recharging in a hilly area, taking into consideration a vehicle state (battery temperature, motor temperature, inverter temperature, etc.).

In addition, in accordance with the present disclosure, it may be possible to execute control to prevent occurrence of restriction of regenerative braking during downhill road travel after recharging by learning positions of hilly area recharging stations and, as such, limiting a full SOC upon recharging in a hilly area, The present disclosure may be embodied as a computer-readable recording medium on which a program for executing a battery management method of a battery management system for vehicles is written. The recording medium may execute procedures provided in the battery management method of the battery management system for vehicles according to any one of forms of the present disclosure.

In addition, the present disclosure may be embodied as computer-readable code, which can be written on a program-stored recording medium. The recording medium that can be read by a computer includes all kinds of recording media, on which data that can be read by a computer system is written. Examples of recording media that can be read by a computer may include a hard disk drive (HDD), a solid state drive (SSD), a silicon disk drive (SDD), a read only memory (ROM), a random access memory (RAM), a CD-ROM, a magnetic tape, a floppy disk, an optical data storage, and the like.

It will be appreciated by persons skilled in the art that the effects that can be achieved through the present disclosure are not limited to what has been particularly described hereinabove and other advantages of the present disclosure will be more clearly understood from the above detailed description. It will be apparent to those skilled in the art that various modifications and variations can be made in the present disclosure without departing from the spirit or scope of the present disclosure. Thus, it is intended that the present disclosure covers the modifications and variations of the exemplary forms of present disclosure.

What is claimed is:

1. A battery management system for a vehicle, comprising:
   a position information acquisition unit configured to acquire position information of a recharging station and the vehicle;
   a storage configured to store a hilly area recharging station list comprising position information of hilly area recharging stations and learned full state of charge (SOC) values; and a controller configured to control the position information acquisition unit and the storage, wherein the controller is configured to:

control the position information acquisition unit upon receiving a battery recharging request to acquire position information of a current recharging station, check whether or not the current recharging station is on the hilly area recharging station list, based on the acquired position information of the current recharging station, check whether or not there is a learned full SOC value corresponding to the current recharging station when the current recharging station is on the hilly area recharging station list, execute battery recharging in the current recharging station based on a learned full SOC value corresponding to the current recharging station when there is the learned full SOC value, and adjust the learned full SOC value based on an SOC value corresponding to an end time of downhill road travel of the vehicle when the vehicle travels on a downhill road or whether or not there is a restriction of regenerative braking at the end time of the downhill road travel, thereby executing re-learning of the learned full SOC value.

2. The battery management system according to claim 1, wherein, upon checking whether or not the current recharging station is on the hilly area recharging station list, the controller is configured to recognize the current recharging station as being located in a hilly area when the current recharging station is on the hilly area recharging station list, and then predict downhill road travel of the vehicle.

3. The battery management system according to claim 1, wherein, upon checking whether or not the current recharging station is on the hilly area recharging station list, the controller is configured to:

execute battery recharging to a full SOC value when the current recharging station is not on the hilly area recharging station list, check whether or not the restriction of regenerative braking occurs when the vehicle travels on the downhill road, and add information of the current recharging station to the hilly area recharging station list when the restriction of regenerative braking occurs.

4. The battery management system according to claim 1, wherein, upon checking whether or not there is a learned full SOC value corresponding to the current recharging station, the controller is configured to execute battery recharging to a SOC value lower than a full SOC value in the current recharging station when there is no learned full SOC value corresponding to the current recharging station.

5. The battery management system according to claim 1, wherein, upon re-learning the learned full SOC value through adjustment of the learned full SOC value, the controller is configured to execute re-learning of the learned full SOC value by calculating an SOC value corresponding to the end time of the downhill road travel when the vehicle travels on the downhill road after battery recharging, and adjusting the learned full SOC value based on the calculated SOC value.

6. The battery management system according to claim 5, wherein, upon calculating the SOC value corresponding to the end time of the downhill road travel, the controller is configured to:

control the position information acquisition unit to acquire position information of the vehicle when the vehicle travels on the downhill road after battery recharge, identify the end time of the downhill road travel based on the position information of the vehicle, and calculate the SOC value corresponding to the end time of the downhill road travel under a condition that the end time of the downhill road travel is identified.

7. The battery management system according to claim 5, wherein, upon re-learning the learned full SOC value through adjustment of the learned full SOC value based on the calculated SOC value, the controller is configured to compare the calculated SOC value with a full SOC value calculated at an end time of battery recharging, and adjust the learned full SOC value based on compared results, thereby re-learning the learned full SOC value.

8. The battery management system according to claim 7, wherein the controller is configured to adjust the learned full SOC value such that the full SOC value calculated at the end time of battery recharging increases when the calculated SOC value is determined to be equal to or lower than the full SOC value calculated at the end time of battery recharging based on a comparison between the calculated SOC value and the calculated full SOC value, thereby re-learning the learned full SOC value.

9. The battery management system according to claim 7, wherein the controller is configured to maintain the learned full SOC value calculated at the end time of battery recharging without adjustment when the calculated SOC value is determined to be higher than the calculated full SOC value based on a comparison between the calculated SOC value and the calculated full SOC value.

10. The battery management system according to claim 1, wherein, upon re-learning the learned full SOC value through adjustment of the learned full SOC value, the controller is configured to check the restriction of regenerative braking at the end time of downhill road travel when the vehicle travels on the downhill road after battery recharging, and adjust the learned full SOC value based on whether or not there is the restriction of regenerative braking, thereby re-learning the learned full SOC value.

11. A battery management method of a battery management system for a vehicle, where the battery management system includes a controller configured to control a position information acquisition unit to acquire position information of a recharging station and the vehicle, and a storage configured to store a hilly area recharging station list, the battery management method comprising:

checking, by the controller, whether or not there is a battery recharging request;

acquiring, by the controller, position information of a current recharging station through the position information acquisition unit when there is a battery recharging request;

checking, by the controller, whether or not the current recharging station is on the hilly area recharging station list, based on the acquired position information of the current recharging station;

checking, by the controller, whether or not there is a learned full state of charge (SOC) value corresponding to the current recharging station when the current recharging station is on the hilly area recharging station list;

executing, by the controller, battery recharging in the current recharging station based on a learned full SOC value corresponding to the current recharging station when there is the learned full SOC value;

checking, by the controller, whether or not the vehicle travels on a downhill road; and executing, by the controller, re-learning of the learned full SOC value when the vehicle travels on the downhill road by adjusting the learned full SOC value based on an SOC value corresponding to an end time of the downhill road travel or whether or not there is a restriction of regenerative braking at the end time of the downhill road travel.

12. The battery management method according to claim 11, wherein checking whether or not the current recharging station is on the hilly area recharging station list comprises:

recognizing the current recharging station as being located in a hilly area when the current recharging station is on the hilly area recharging station list, and predicting downhill road travel of the vehicle.

13. The battery management method according to claim 11, wherein checking whether or not the current recharging station is on the hilly area recharging station list comprises:

executing battery recharging to a full SOC value when the current recharging station is not on the hilly area recharging station list;

checking whether the restriction of regenerative braking occurs when the vehicle travels on the downhill road; and adding information of the current recharging station to the hilly area recharging station list when the restriction of regenerative braking occurs.

14. The battery management method according to claim 11, wherein checking whether or not there is a learned full SOC value corresponding to the current recharging station comprises:

recharging a battery to a SOC value lower than a full SOC value in the current recharging station when there is no learned full SOC value corresponding to the current recharging station.

15. The battery management method according to claim 11, wherein executing re-learning of the learned full SOC value through adjustment of the learned full SOC value comprises:

calculating an SOC value corresponding to the end time of downhill road travel when the vehicle travels on the downhill road after battery recharging, and adjusting the learned full SOC value based on the calculated SOC value, thereby re-learning the learned full SOC value.

16. The battery management method according to claim 15, wherein calculating the SOC value corresponding to the end time of downhill road travel comprises:

acquiring position information of the vehicle when the vehicle travels on the downhill road after battery recharge;

identifying the end time of the downhill road travel based on the position information of the vehicle; and calculating the SOC value corresponding to the end time of the downhill road travel under a condition that the end time of the downhill road travel is identified.

17. The battery management method according to claim 15, wherein executing re-learning of the learned full SOC value through adjustment of the learned full SOC value based on a calculated SOC value comprises:

comparing the calculated SOC value with a full SOC value calculated at an end time of battery recharging, and adjusting the learned full SOC value based on compared results, thereby re-learning the learned full SOC value.

18. The battery management method according to claim 17, wherein executing re-learning of the learned full SOC value through adjustment of the learned full SOC value comprises:

adjusting the learned full SOC value such that the full SOC value calculated at the end time of battery recharging increases when the calculated SOC value is determined to be equal to or lower than the full SOC value calculated at the end time of battery recharging based on a comparison between the calculated SOC value and the calculated full SOC value, thereby re-learning the learned full SOC value.

19. The battery management method according to claim 17, wherein executing re-learning of the learned full SOC value through adjustment of the learned full SOC value comprises:

maintaining the learned full SOC value calculated at the end time of battery recharging without adjustment when the calculated SOC value is determined to be higher than the calculated full SOC value based on a comparison between the calculated SOC value and the calculated full SOC value.

20. The battery management method according to claim 11, wherein executing re-learning of the learned full SOC value through adjustment of the learned full SOC value comprises:

checking whether or not there is the restriction of regenerative braking at the end time of downhill road travel when the vehicle travels on the downhill road after battery recharging, and adjusting the learned full SOC value based on whether or not there is the restriction of regenerative braking, thereby re-learning the learned full SOC value.

* * * * *